(12) United States Patent
Hein et al.

(10) Patent No.: US 7,562,851 B2
(45) Date of Patent: Jul. 21, 2009

(54) SPRING ARM AND BODY SUPPORT

(75) Inventors: Dieter Hein, Windach-Hechenwang (DE); Curt O. Schaller, Munich (DE); Roland Seipel, Gachenbach/Sattelberg (DE)

(73) Assignee: Camera Dynamics GmbH, Eching (DE)

( * ) Notice: Subject to any disclaimer, the term of this patent is extended or adjusted under 35 U.S.C. 154(b) by 430 days.

(21) Appl. No.: 11/401,549

(22) Filed: Apr. 11, 2006

(65) Prior Publication Data

US 2006/0258495 A1    Nov. 16, 2006

(30) Foreign Application Priority Data

Apr. 15, 2005   (DE) .................. 10 2005 017 487

(51) Int. Cl.
*A47F 5/00*   (2006.01)

(52) U.S. Cl. .................. 248/281.11; 248/284.1; 248/280.11; 248/276.1; 248/585; 396/421

(58) Field of Classification Search .......... 248/284.1, 248/281.11, 280.11, 276.1, 585
See application file for complete search history.

(56) References Cited

U.S. PATENT DOCUMENTS

| | | | |
|---|---|---|---|
| 4,017,168 A | | 4/1977 | Brown |
| 4,156,512 A | | 5/1979 | Brown |
| 4,208,028 A | | 6/1980 | Brown et al. |
| 4,394,075 A | | 7/1983 | Brown et al. |
| 4,447,031 A | * | 5/1984 | Souder et al. .......... 248/281.11 |
| 4,523,732 A | | 6/1985 | Biber et al. |
| 4,591,122 A | | 5/1986 | Kreuzer |
| 4,852,842 A | * | 8/1989 | O'Neill .................. 248/284.1 |
| 5,360,196 A | * | 11/1994 | DiGiulio et al. ........... 248/576 |
| 5,435,515 A | * | 7/1995 | DiGiulio et al. ........... 248/576 |
| 5,505,424 A | * | 4/1996 | Niemann .................. 248/585 |
| 6,030,130 A | | 2/2000 | Paddock et al. |
| 6,064,426 A | * | 5/2000 | Waterman .................. 348/63 |
| 6,523,796 B2 | * | 2/2003 | Abramowsky et al. ... 248/284.1 |

(Continued)

FOREIGN PATENT DOCUMENTS

DE   34 16 823 A1   12/1984

(Continued)

OTHER PUBLICATIONS

Search Report mailed Feb. 23, 2007 for European Application No. 06007591.8.

*Primary Examiner*—J. Allen Shriver, II
*Assistant Examiner*—Michael McDuffie
(74) *Attorney, Agent, or Firm*—Wolf, Greenfield & Sacks, P.C.

(57) ABSTRACT

A spring arm (1) for a camera body support is provided with a parallelogram guide (3, 5) which is made up of two opposing legs (10, 11) disposed parallel to one another and two likewise opposing connecting elements (12, 13) that connect the respective ends of the legs (10, 11) with one another, and an energy storage mechanism (15), which is supported on two pivot points (17, 19) on the parallelogram guide (3, 5), in order to compensate a load acting on the parallelogram guide (3, 5). At least one (19) of these pivot points (17, 19) is adjustable in relation to the parallelogram guide (3, 5) such that both the energy storage mechanism's (15) pretension and also its action of force direction change.

16 Claims, 8 Drawing Sheets

U.S. PATENT DOCUMENTS

| | | | |
|---|---|---|---|
| 6,550,734 B1 * | 4/2003 | Spadea | 248/280.11 |
| 6,575,644 B2 * | 6/2003 | Paddock et al. | 396/421 |
| 6,592,090 B1 | 7/2003 | Li | |
| 2004/0245419 A1 * | 12/2004 | Sweere et al. | 248/276.1 |
| 2005/0224670 A1 | 10/2005 | Metelski | |

FOREIGN PATENT DOCUMENTS

| | | |
|---|---|---|
| DE | G8316534.7 U1 | 3/1985 |
| DE | 4318659 A1 | 12/1994 |
| EP | 1 586 925 A1 | 10/2005 |
| GB | 2 230 946 A | 11/1990 |
| WO | WO 94/29636 A1 | 12/1994 |
| WO | WO 95/25927 A1 | 9/1995 |

* cited by examiner

SPRING ARM AND BODY SUPPORT

TECHNICAL FIELD

The present invention relates to a body support having a spring arm according to the preamble of claim 1.

PRIOR ART

Body supports for cameras with a spring arm have inherently been known since the mid 70s and have been described for example in U.S. Pat. Nos. 4,017,168, 4,156,512, 4,208,028 and 4,394,075 as well as U.S. Pat. No. 6,030,130. The spring arm of the body support is fixed on one of its ends to the cameraman's body by way of a carrying strap, and the camera is attached on the other end of the spring arm either simply by way of a camera sled or also by way of a pendulum system (gimbal). The camera's weight is supported on the cameraman's body by means of the body support. This makes guiding the camera considerably easier by comparison with a situation where the cameraman has to hold the whole weight of the camera in his hands.

In this regard the camera's movement is essentially decoupled from the cameraman's movement. Thus the cameraman can shoot film whilst walking or even running without his walking or running movements being transferred to the camera and shaking the image. Rather the camera floats in space and can easily be tilted up and down by way of the spring arm as well as panned left and right around a swivel axis provided on the body support.

The spring arm of such a body support usually has at least one parallelogram guide. The camera is then always held in the horizontal direction on the cameraman's body independently of the spring arm's position. Often two parallelogram guides are also joined flexibly together in one spring arm to increase still further the freedom of movement to guide the camera.

Furthermore, at least one energy storage mechanism is present in the spring arm, especially in the form of compression or tension springs, which is designed such that it compensates as completely as possible the weight applied by the camera. The known systems often work with traction cables, deflection pulleys and tension springs to ensure counterbalancing of the weight in the spring arm's various positions. Tension springs without Bowden cable are also used between the parallelogram rods. In this regard, it may be that shortening and lengthening of the spring element's pivot points work on tension or compression in which case both tension springs and also compression springs may be used. Classic springs, on their own or in conjunction with gas springs, are also used.

It should be possible to use such a body support for different cameras, for example really lightweight video cameras or also considerably heavier film cameras. It should also be possible to attach further weights in the form of batteries, monitors, etc. without impairing the support's performance. Thus it should be possible to adapt the body support to accommodate different weights.

To solve this problem, DE 34 16 823 A1 for example proposes to adapt the counterforce to the weight of the devices held by inserting a plurality of compression springs or by removing compression springs.

However, regardless of this, the energy storage mechanism will also vary its spring force on a movement of the parallelogram guide. Thus, in different positions of the parallelogram guide, the energy storage mechanism exerts a varying force which may possibly exceed or fall short of the force exerted by the camera itself. The cameraman has to absorb this differential force, which leads of course to impairment of the camera's guidance: often the spring arm's optimum performance is only generated in the horizontal position whilst in its very upwardly deflected position the spring arm only applies an insufficient force. An extreme progression in the spring arm's lower movement range is also problematic.

German utility model 83 16 534 describes a spring arm for a support which likewise has such a parallelogram guide. A gas spring is provided to relieve the weight. One of the two pivot points of this gas spring can be moved for precision adjustment of the counterforce applied by the gas spring such that there is a change in the angle between the longitudinal axis of this gas spring and the parallelogram. This adjustment may be stepless or may be made in steps.

PRESENTATION OF THE INVENTION

The object of the invention is to create a body support having a spring arm which exactly compensates the weight of a device to be held and guided in any position.

This object is solved with a body support according to claim 1.

As a result, in a spring arm with a parallelogram guide, which is made up of two opposing legs disposed parallel to one another and two likewise opposing connecting elements that connect the respective ends of said legs with one another, and at least one energy storage mechanism, which is supported on two pivot points on the parallelogram guide, in order to compensate a load acting on said parallelogram guide, at least one of these pivot points is adjustable in relation to the parallelogram guide such that both the energy storage mechanism's pretension and its action of force direction change.

Therefore, according to the invention, the change in the energy storage mechanism's action of force direction referred to above is maintained to influence the energy storage mechanism's mode of operation. However, the invention provides that said pivot point of the energy storage mechanism is adjustable in relation to the parallelogram guide such that in addition the energy storage mechanism's action of force direction also changes.

Thus the cameraman can adjust the energy storage mechanism's adjustable pivot point in any position of the parallelogram guide such that the energy storage mechanism exactly compensates the weight of the camera to be guided.

In this regard the spring arm is designed such that it acts purely as an energy storage mechanism, thus it evenly provides the force needed in every position of the parallelogram guide and does not act with different forces in different positions. The device guided by means of the parallelogram guide can thus be moved upwards and downwards through practically its entire range of movement with the force remaining constant.

Due to the innovative adjustability of the energy storage mechanism's pivot points it is also possible to optimize any kinematics of a parallelogram which have been calculated less than optimally. In this way it is possible to absorb production errors and tolerances.

Advantageous further developments of the spring arm according to the invention are contained in the dependent claims.

Preferably, the at least one pivot point is adjustable such that there is a change in both the distance between the energy storage mechanism's pivot points and also the angle between a longitudinal axis of the energy storage mechanism and the direction of the load acting on the parallelogram guide.

A positioning element is preferably provided which supports the adjustable pivot point on the parallelogram guide in order to vary the energy storage mechanism's pretension and action of force direction. The shape of this positioning element is then suitably calculated such that operating the positioning element changes both the distance between the spring's pivot points (i.e. the spring pretension) and also the angle between a longitudinal axis of the energy storage mechanism and the parallelogram guide (i.e. the action of force direction).

For example, the positioning element may link the adjustable pivot point with one of the two connecting elements whilst a fixed pivot point of the energy storage mechanism is supported on a leg of the parallelogram guide.

The positioning element may be capable of linear movement for changing the energy storage mechanism's pretension and action of force direction. Then there can be at least one slot provided in the positioning element by way of which it is linked to the parallelogram guide, whereby the size and shape of this slot determine the extent of the positioning element's possible displacement in relation to the parallelogram guide.

Equally, however, it is possible that the positioning element for altering the pretension and the direction of force action can be moved along a curve. This may be provided by a curve or guide rail formed in a second leg of the parallelogram guide in which a cantilever arm of the positioning element is engaged.

In either case, the positioning element is preferably movable between a maximum position and a minimum position whereby, in the maximum position of the positioning element, a longitudinal axis of the energy storage mechanism forms a smaller angle with the direction of the load acting on the parallelogram guide than in the minimum position. Then the component of the energy storage mechanism's equalizing force acting against the load is greater in the maximum position than in the minimum position.

The energy storage device may have at least one compression spring which has the advantage that this has a lower progression behavior due to its characteristics. However, tension spring arrangements are also possible.

DETAILED DESCRIPTION OF A PREFERRED EMBODIMENT OF THE INVENTION

A first preferred embodiment of a spring arm according to the invention will now be described with reference to FIGS. 1 to 5 of the drawings.

Figure 1:
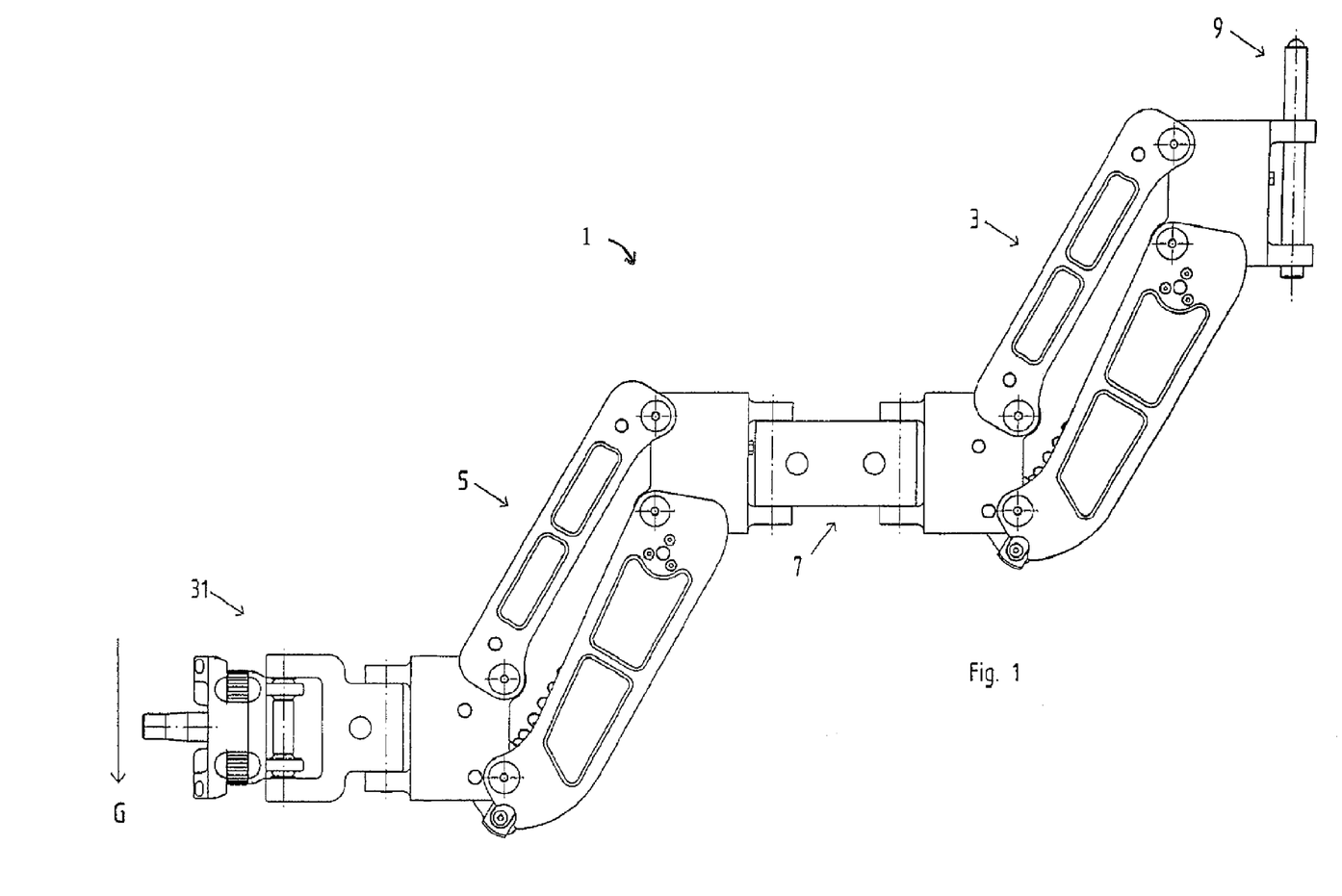
FIG. 1 shows an overall view of a first embodiment of the spring arm according to the invention.

FIG. 1 shows an overall view of a spring arm 1 according to the invention. This consists primarily of two parallelogram guides 3 and 5 which are linked to one another by way of coupling element 7 and which will be discussed in greater detail at a later point. On its first end, spring arm 1 has a pin 9 by way of which it can be pivotably attached to a belt or harness of the cameraman. A holder 31 on the other end of the spring arm serves for attachment of the camera to be guided.

The two parallelogram guides 3 and 5 are basically identical in design. Therefore, only parallelogram 3 is represented in FIGS. 2 to 5; however, all the explanations of it also apply equally to parallelogram guide 5.

Figure 2:
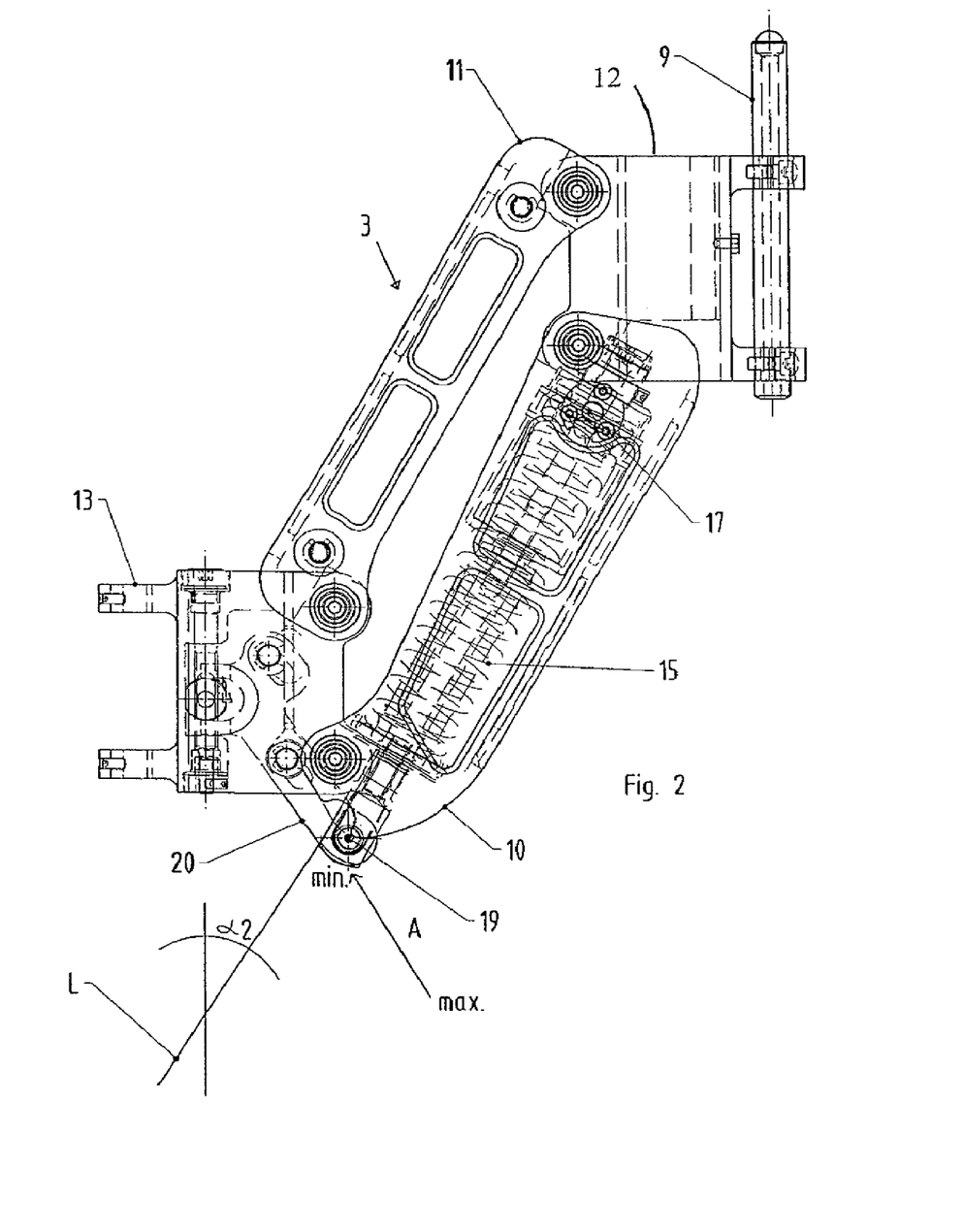
FIG. 2 shows a parallelogram guide of this spring arm according to the invention in a top position wherein a positioning lever is brought into a maximum position.

Parallelogram guide 3 is formed by two opposing legs 10, 11 disposed parallel to one another and two connecting elements 12, 13, which are likewise opposing. First ends of legs 10, 11 are pivotably attached to connecting element 12 and second ends of legs 10, 11 are pivotably attached to connecting element 13 so that legs 10, 11 and connecting elements 12, 13 form an inherently adjustable parallelogram. In this regard connecting elements 12, 13 always remain in a vertical orientation so that a camera attached on the end of the spring arm is always held in a horizontal position regardless of the parallelogram's deflection.

The weight of a camera attached to spring arm 1 (the direction of the weight is identified in FIG. 1 by the arrow "G") is compensated in this embodiment by way of a compression spring arrangement 15. This is housed in a sleeve which supports and guides compression spring arrangement 15. There is also a pretensioning mechanism within this sleeve.

The deflection and angle position of compression spring arrangement 15 change dynamically during an upward and downward movement of the camera. Thus the force ratios changing during the upward and downward movement of the camera are compensated.

Compression spring arrangement 15 is pivoted at two points on parallelogram guide 3: in a first pivot point 17, compression spring arrangement 15 is supported on leg 10 of the parallelogram guide. This pivot point 17 is not adjustable here in relation to leg 10 (which could, however, be the case); compression spring arrangement 15 is merely pivotably disposed around this pivot point 17. In contrast, according to the invention, second pivot point 19 is supported movably on the parallelogram guide.

In addition, in the embodiment described here, a positioning element in the form of positioning lever 20 is provided which links movable pivot point 19 with connecting element 13.

Here positioning lever 20 has, as an example, two slots 22, 24 through which extend two axes 23, 25 so that positioning lever 20 is supported to be moveable on connecting element 13. The extent of the displacement of positioning lever 20 in relation to connecting element 13 is limited by the shape and size of the two slots 22, 24.

Actuation of positioning lever 20 by the operator is by means of an adjusting screw 28 (cf. FIG. 3) which is engaged with a spindle nut 30 such that spindle nut 30 moves upwards or downwards on turning adjusting screw 28. Spindle nut 30 for its part is engaged in a U-shaped driver fork 26 of positioning lever 20 such that a horizontal movement (i.e. a movement at right angles to adjusting screw 28) is possible between spindle nut 30 and driver fork 26.

Figure 3:
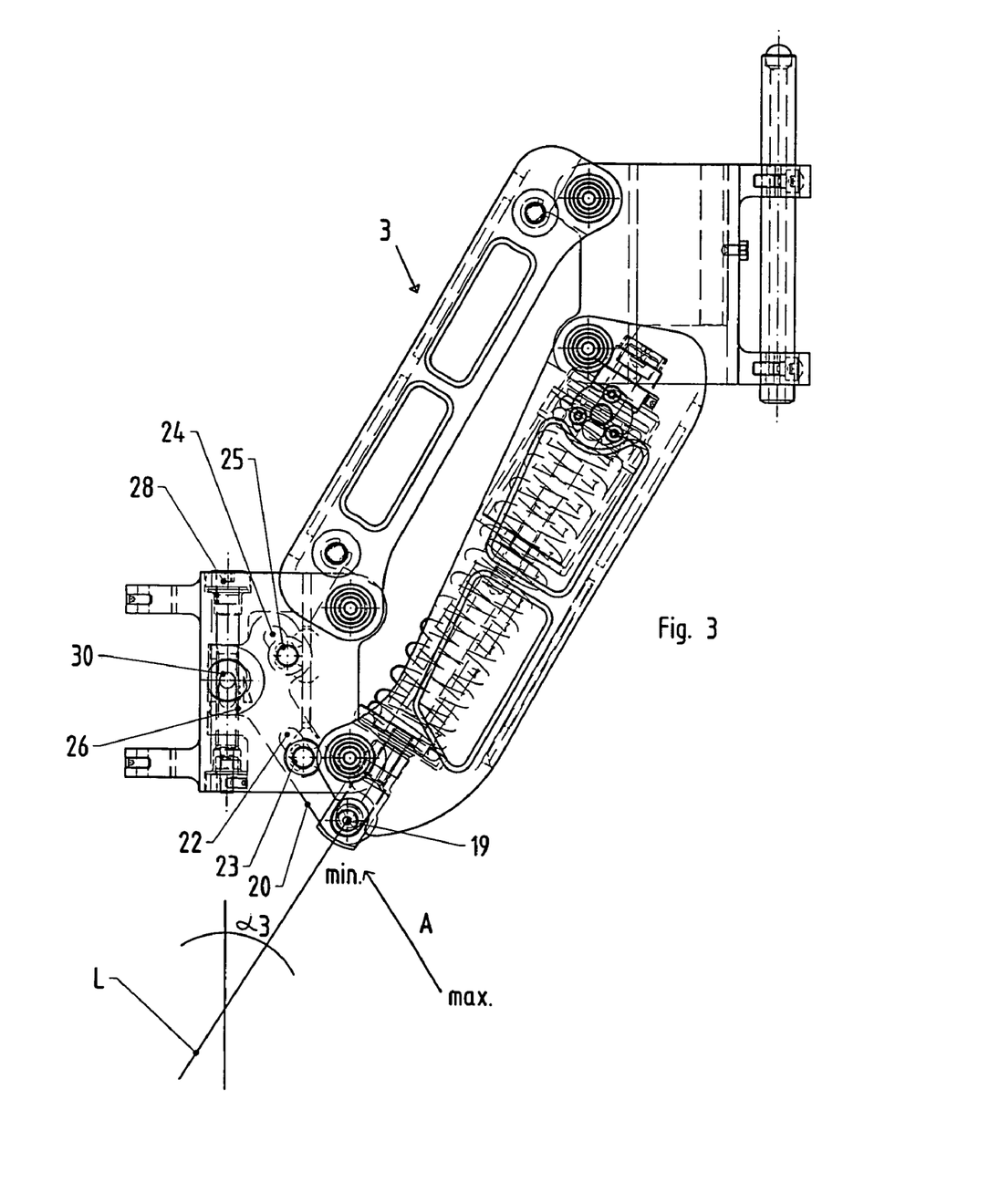
FIG. 3 shows this parallelogram guide in the top position wherein the positioning lever is brought into a minimum position.

The mode of function of positioning lever 20 is best illustrated by a comparison of FIGS. 2 and 3. In both Figures, parallelogram guide 3 is shown in the same position, that is, in an upwardly deflected position. However, in FIG. 2, positioning lever 20 is in a position displaced as far as possible to the top left in the drawing (maximum position), whilst in FIG. 3 in contrast it is in a position displaced as far as possible to the bottom right in the drawing (minimum position).

First of all, the comparison of FIGS. 2 and 3 shows that pivot point 19 of compression spring arrangement 15 can be displaced in relation to parallelogram guide 3 by means of positioning lever 20—with an unchanged position of parallelogram guide 3, displacement of positioning lever 20, guided by its slots 22 and 24 and associated axes 23 and 25, causes a displacement of adjustable or variable pivot point 19 in the direction of arrow A (=direction of extension of slots 22 and 24) shown in FIGS. 2 and 3. This displacement of pivot point 19 along arrow A has two effects: firstly, the distance between fixed pivot point 17 and variable pivot point 19 changes; in the maximum position (FIG. 2) this distance is greater than in the minimum position (FIG. 3) as a result of which the pretension of compression spring arrangement 15 changes correspondingly.

However, at the same time the action of force direction of compression spring arrangement 15 also changes: the longitudinal axis of compression spring arrangement 15, identified by "L" in FIGS. 2 and 3, forms an angle $\alpha 2$ with the vertical in the maximum position of positioning lever 20 (FIG. 2) which is smaller than the corresponding angle $\alpha 3$ in the minimum position (FIG. 3). The vertical corresponds to the direction in which the weight of a camera acts on parallelogram guide 3 (cf. FIG. 1). In the maximum position (FIG. 2), the component of the spring force, which acts against the weight of the camera directed downwards, is thus greater than in the minimum position (FIG. 3).

Figure 4:
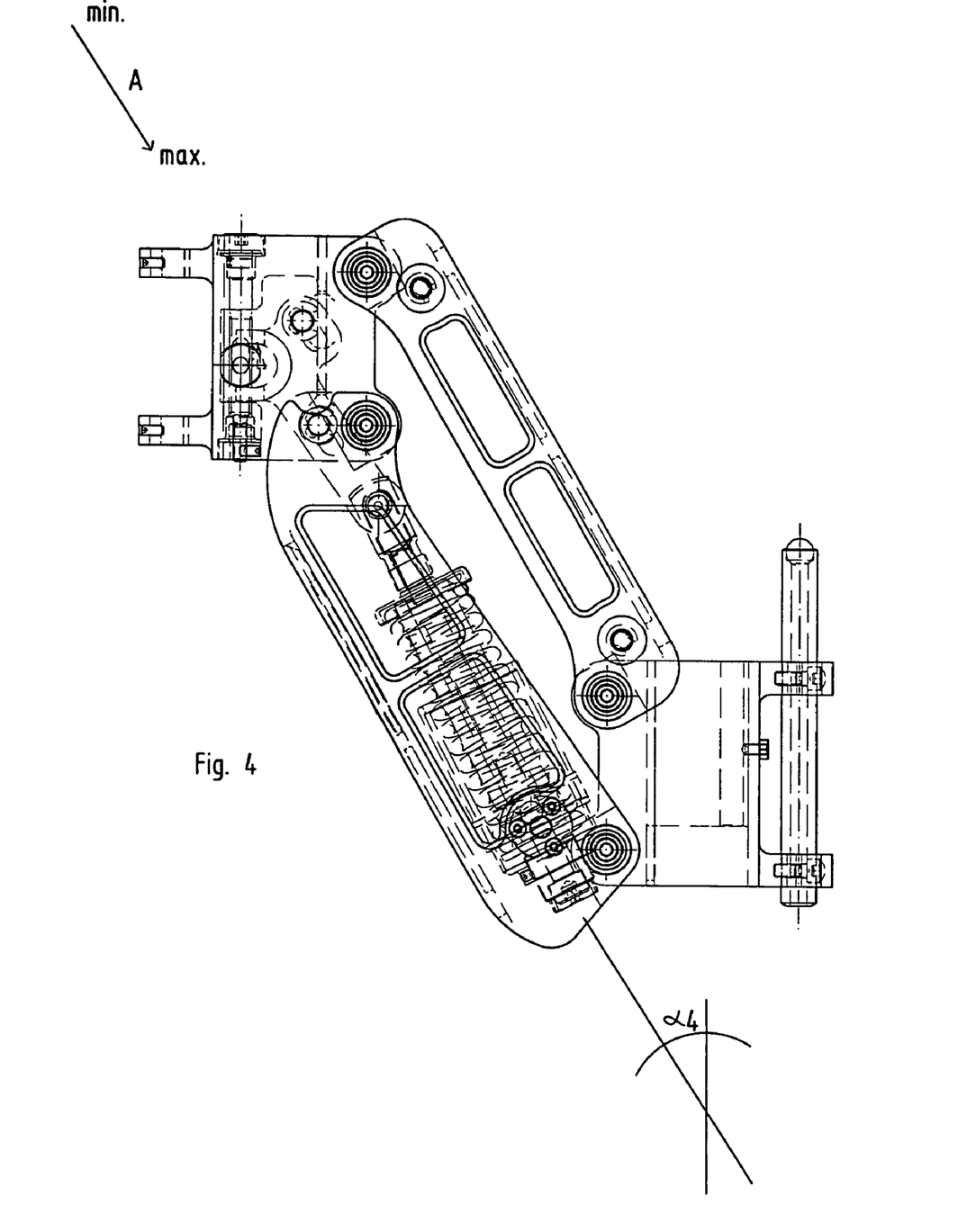
FIG. 4 shows this parallelogram guide in a bottom position wherein the positioning lever is brought into the maximum position.
Figure 5:
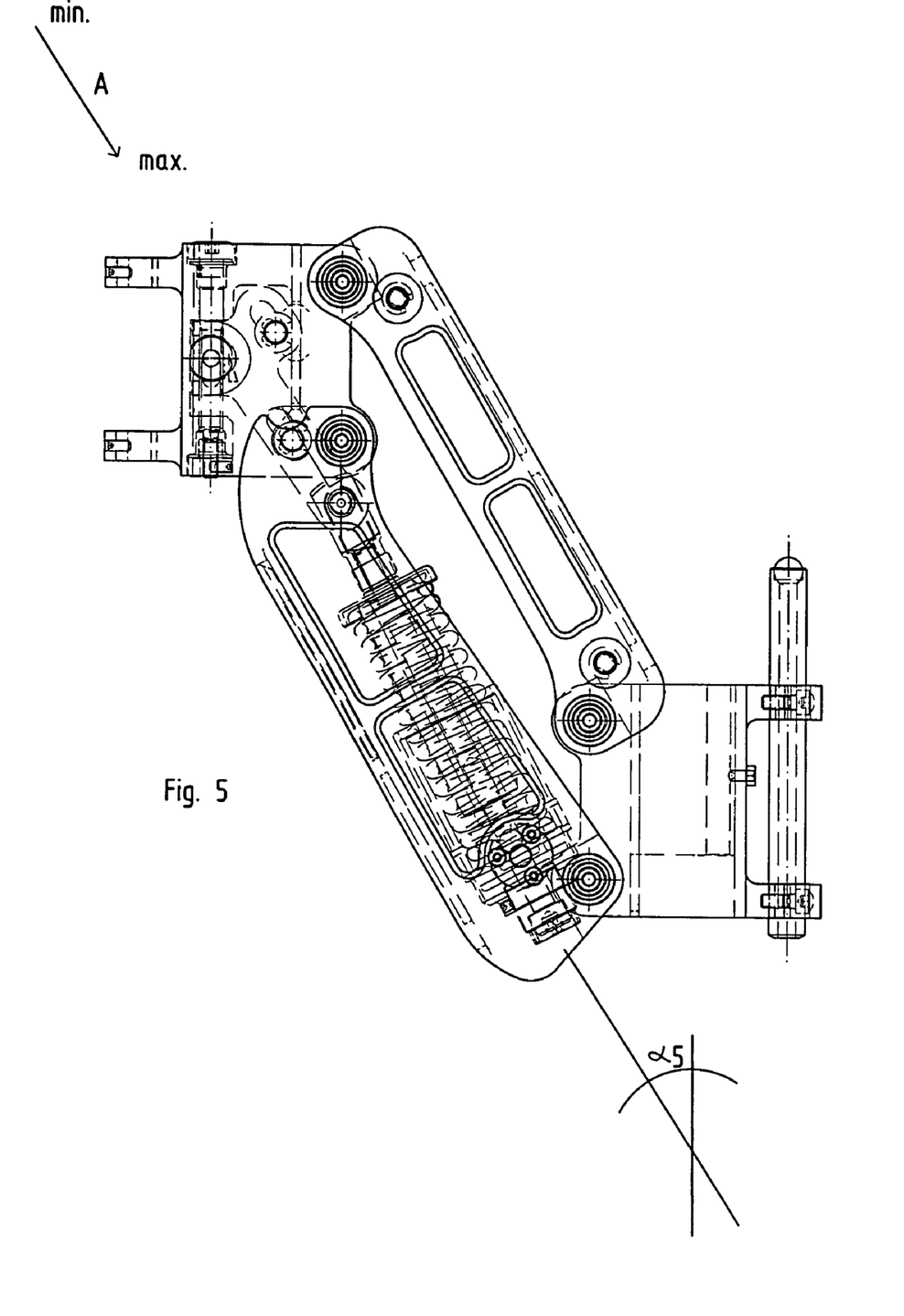
FIG. 5 shows this parallelogram guide in the bottom position wherein the positioning lever is brought into the minimum position.

FIGS. 4 and 5 illustrate a corresponding actuation of positioning lever 20 from a maximum position (FIG. 4) to a minimum position (FIG. 5) in a downwardly deflected direction of parallelogram guide 3. The position of parallelogram guide 3 in FIGS. 4 and 5 is in turn the same, only the position of variable pivot point 19 of compression spring arrangement 15 changes by displacing positioning lever 20 in the direction of arrow A which is determined by slots 22, 24 and axes 23, 25.

Here too in the maximum position (FIG. 4), longitudinal axis L of compression spring arrangement 15 forms a smaller angle $\alpha_4$ in relation to the vertical, i.e. relative to the direction of a camera's weight, than in the minimum position ($\alpha_5$, FIG. 5), i.e. the component of the spring force acting against the weight is greater in the maximum position than in the minimum position. At the same time, the distance between fixed 17 and variable pivot point 19 of compression spring arrangement 15 is smaller in the maximum position (FIG. 4) than in the minimum position (FIG. 5) with the corresponding effect on the pretension of compression spring arrangement 15.

In summary it may be asserted that both the distance between the two pivot points 17 and 19 and also the angle between longitudinal axis L of compression spring arrangement 15 change in relation to parallelogram guide 3 by actuating positioning lever 20. Thus, actuation of positioning lever 20 causes both a change in the pretension as well as a change in the action of force direction of compression spring arrangement 15.

Thus it is possible to adapt the mode of operation of compression spring arrangement 15 in any position of parallelogram guide 3 by an appropriate displacement of positioning lever 20 such that compression spring arrangement 15 exactly compensates the weight of the camera to be guided.

Figure 6:
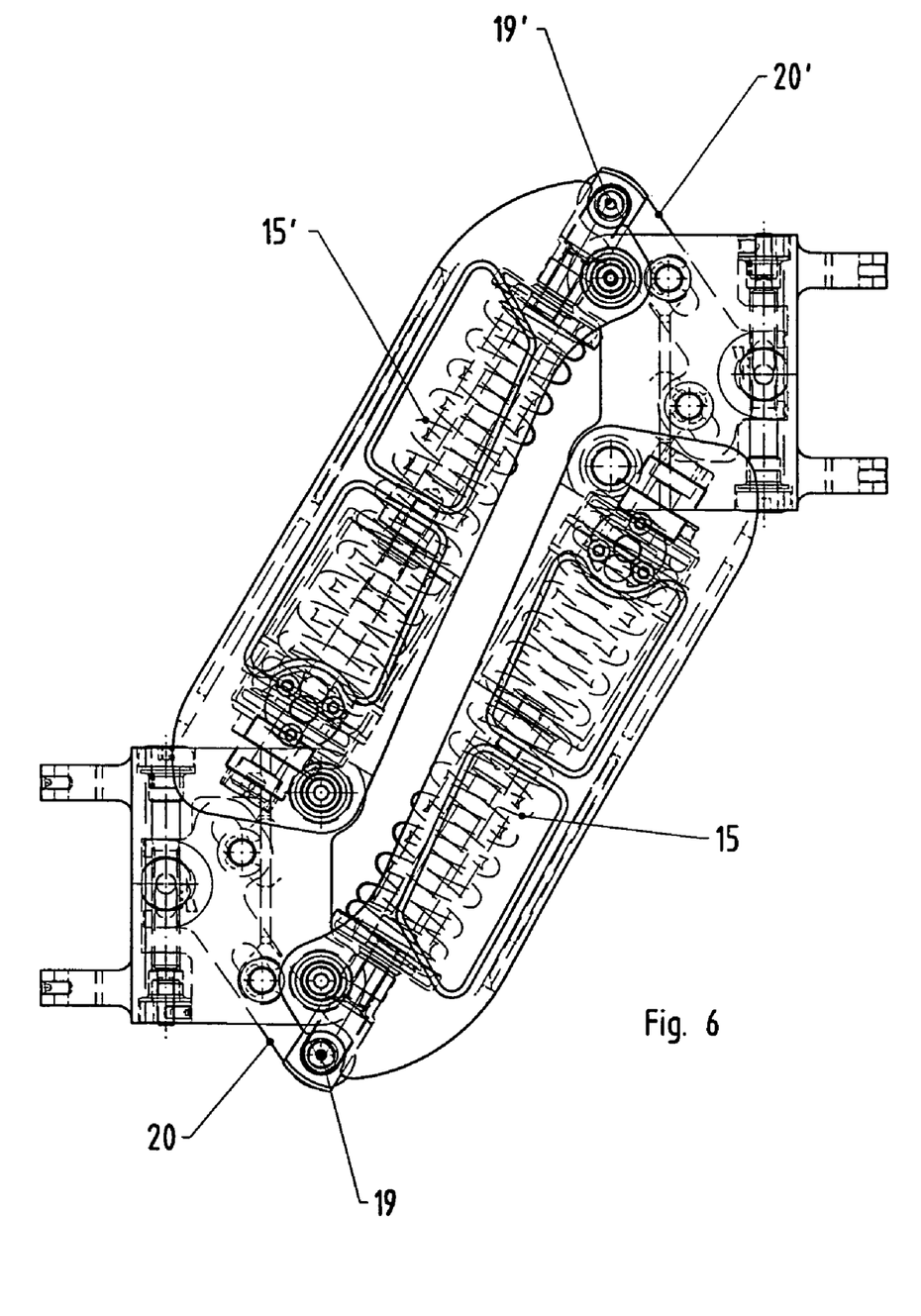
FIG. 6 shows a variation of a parallelogram guide according to the invention with two compression spring arrangements.

Proceeding from the embodiment described above, the following variations, are conceivable:

First of all it is possible to combine two compression spring arrangements in one parallelogram. A parallelogram guide according to this variation is shown in FIG. 6.

The two compression spring arrangements 15, 15' lie mirror-inverted opposite one another in the parallelogram and act together. Each compression spring arrangement 15, 15' is provided with its own positioning lever 20, 20' for a movable pivot point 19, 19'. This combination doubles the spring arm's load-bearing capacity.

Figure 7:
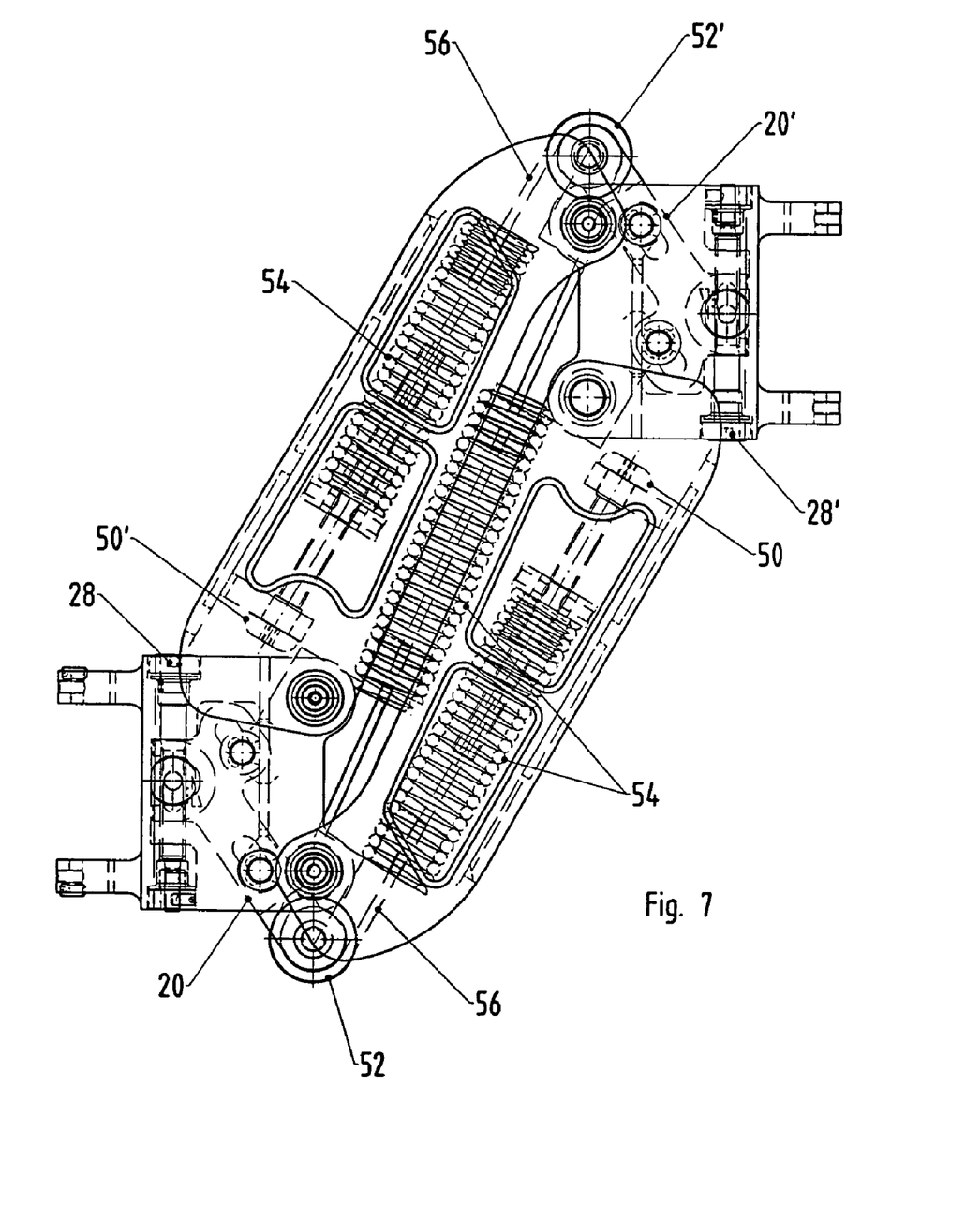
FIG. 7 shows a variation of a parallelogram guide according to the invention with tension springs.

In addition, an embodiment with a tension spring strand of one to three tension springs is also conceivable. A parallelogram guide according to this variation is shown in FIG. 7; here three tension springs 54 are provided. Deflection pulleys 52, 52' of a parallelogram designed in a "Z-shape" are housed in positioning elements 20, 20'. Tension springs 54 or rather the cables 56 connecting them run around these curve-shaped variable deflection pulleys 52, 52'. Pretensioning of the spring strand is achieved both by way of tensioning screws 50, 50' on the parallelogram's housing as well as by way of positioning elements 20, 20'.

As a further variation it is provided that the variable pivot point is not linearly movable (in the direction of arrow A as in the embodiment described above with reference to FIGS. 1 to 5) but moves on a curve on actuation of the positioning element. For this it would basically be possible, for example, to have openings corresponding to slots 22 and 24 referred to above which guide positioning element 20 but which are designed as a curve.

Figure 8:
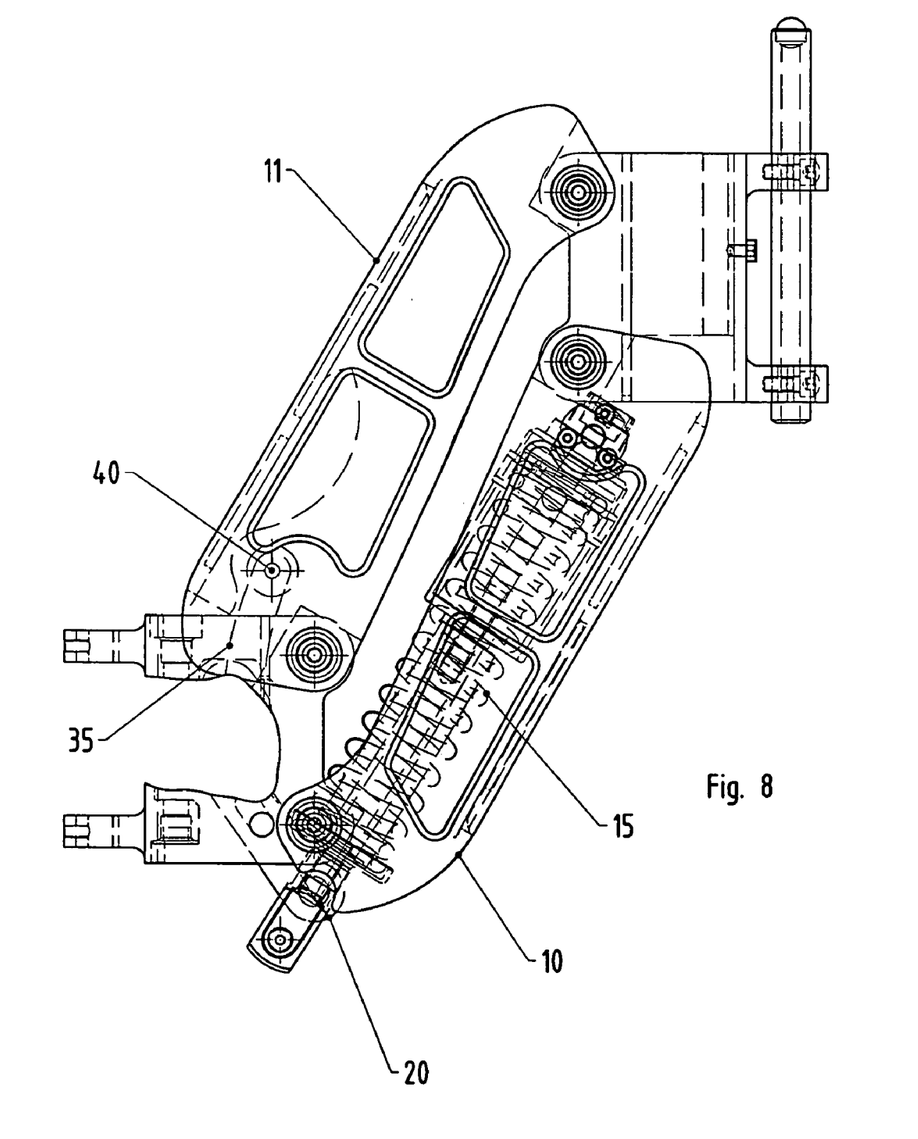
FIG. 8 shows a further variation of a parallelogram guide according to the invention with compression spring and control curve.

According to a further development of the invention, positioning lever 20 is disposed on parallelogram guide 3, 5 such that its position changes dynamically during the camera's upward and downward movement. FIG. 8 shows such a parallelogram guide. It differs from the one discussed above with reference to FIGS. 1 to 5 in that here second leg 11 of the parallelogram acts on positioning lever 20 and thus there is a continuous specific effect on the angle position and the spring force of compression spring 15 in order to exactly compensate a camera's weight in any position of the parallelogram and to allow the camera to "float" in every position.

For this purpose, an element 35 shaped as a curve (control or pivot curve) is located in second leg 11 of the parallelogram. Positioning lever 20 (here only partially represented) is connected to this curve by way of a cantilever arm 40 and travels backwards and forwards over the curve whilst parallelogram guide 3 moves up and down. As a result, the position of positioning element 20 is adapted actively and constantly to the position of the parallelogram guide.

Thus the spring performance and progression of compression spring arrangement 15 can be optimally adapted to the required load in any position of the parallelogram. The behavior of the parallelogram required for the application in each case can now be determined by appropriate selection of pivot curve 35 and spring 15 in respect of their performance, construction and material.

The manual adjustability of positioning lever 20 described with reference to the embodiment of FIGS. 1 to 5 may be possible by way of control curve 35 in addition to dynamically influencing the position of positioning lever 20.

The invention claimed is:

1. Body support having a spring arm on which a device is to be mounted, comprising:

a parallelogram guide which is made up of two opposing legs disposed parallel to one another and pivotably attached to two likewise opposing connecting elements that connect the respective ends of the legs with one another on a line in the direction of weight, an energy storage mechanism, which is supported on two pivot points on the parallelogram guide, in order to compensate a load acting on the parallelogram guide, so that the device is movable through practically its entire range of movement with the force remaining constant, at least one of these pivot points being adjustable in relation to the parallelogram guide in a direction angled to the direction of weight such that both the distance between the energy storage mechanism's pivot points and also the angle between a longitudinal axis of the energy storage mechanism and the direction of the load acting on the parallelogram guide change, whereby both the energy storage mechanism's pretension and also its action of force direction change; and a positioning element which supports the adjustable pivot point on the parallelogram guide, the positioning element being operable by only one actuating element.

2. Body support according to claim 1, in which the positioning element links the adjustable pivot point with one of the two connecting elements, whilst a fixed pivot point of the energy storage mechanism is supported on a first leg of the parallelogram guide.

3. Body support according to claim 1, in which the positioning element is linearly movable to alter the pretension and the action of force direction of energy storage mechanism.

4. Body support according to claim 1, in which at least one slot is provided in the positioning element by way of which it is linked to the parallelogram guide, whereby the size and shape of this slot determine the extent of the positioning element's possible displacement in relation to the parallelogram guide.

5. Body support according to claim 1, in which the positioning element is movable along a curve to alter the pretension and action of force direction of the energy storage mechanism.

6. Body support according to claim 1, in which the positioning element is engaged with a control curve formed in a second leg of the parallelogram guide such that the angle position and spring force of the energy storage mechanism are dynamically influenced on deflection of the parallelogram guide.

7. Body support according to claim 1, in which the energy storage mechanism has at least one compression spring.

8. Body support according to claim 1, in which the energy storage mechanism has at least one tension spring.

9. Body support according to claim 1, in which two parallelogram guides are present and linked to one another by way of a coupling element.

10. Body support according to claim 1, further with an attachment, by way of which it can be attached pivotably to a belt or harness, and a holder for the attachment of a camera.

11. Body support having a spring arm on which a device is to be mounted, comprising:

a parallelogram guide which is made up of two opposing legs disposed parallel to one another and two likewise opposing connecting elements that connect the respective ends of the legs with one another; and an energy storage mechanism having at least two tension springs connected by a cable running around a deflection pulley, which is supported on the parallelogram guide, in order to compensate a load acting on the parallelogram guide, so that the device is movable though practically its entire range of movement with the force remaining constant, the deflection pulley being adjustable in relation to the parallelogram guide such that both the energy storage mechanism's pretension and also its action of force direction change.

12. Body support according to claim 11, in which the positioning element is linearly movable to alter the pretension and the action of force direction of energy storage mechanism.

13. Body support according to claim 11, in which the positioning element is movable along a curve to alter the pretension and action of force direction of the energy storage mechanism.

14. Body support according to claim 11, in which the positioning element is engaged with a control curve formed in a second leg of the parallelogram guide such that the angle position and spring force of the energy storage mechanism are dynamically influenced on deflection of the parallelogram guide.

15. Body support according to claim 11, in which two parallelogram guides are present and linked to one another by way of a coupling element.

16. Body support according to claim 11, further with an attachment, by way of which it can be attached pivotably to a belt or harness, and a holder for the attachment of a camera.

* * * * *